United States Patent [19]
Yoshida et al.

[11] Patent Number: 4,673,276
[45] Date of Patent: Jun. 16, 1987

[54] BLUR DETECTING DEVICE FOR A CAMERA

[75] Inventors: Shozo Yoshida, Tokyo; Hiroshi Ohmura, Saitama, both of Japan

[73] Assignee: Canon Kabushiki Kaisha, Tokyo, Japan

[21] Appl. No.: 704,333

[22] Filed: Feb. 22, 1985

[30] Foreign Application Priority Data

| Feb. 24, 1984 | [JP] | Japan | 59-34063 |
| Feb. 24, 1984 | [JP] | Japan | 59-34064 |
| Feb. 24, 1984 | [JP] | Japan | 59-34065 |
| Feb. 24, 1984 | [JP] | Japan | 59-34066 |
| Jun. 6, 1984 | [JP] | Japan | 59-114526 |

[51] Int. Cl.$^4$ ............................................. G03B 7/08
[52] U.S. Cl. ................................................ 354/430
[58] Field of Search ............... 354/408, 400, 402, 406, 354/407, 430

[56] References Cited

U.S. PATENT DOCUMENTS 4,462,671 7/1984 Suzuki et al. ............... 354/430
4,492,452 1/1985 Suzuki et al. ............... 354/430

FOREIGN PATENT DOCUMENTS

0070217 4/1983 Japan .

Primary Examiner—Russell E. Adams
Attorney, Agent, or Firm—Toren, McGeady & Associates

[57] ABSTRACT

A blur detecting device for a camera comprises a CCD line sensor which is arranged in a position optically equivalent to the surface of the film to produce image signals at different points of time set in response to pushing a shutter button; and a signal processing circuit which computes the degree of a blur which occurred in the image between the different points of time by obtaining the degree of correlation between the image signals.

4 Claims, 18 Drawing Figures

BLUR DETECTING DEVICE FOR A CAMERA

BACKGROUND OF THE INVENTION

1. Field of the Invention

This invention relates to a device for detecting camera motion during the photographing operation of a camera and for giving a warning as necessary.

2. Description of the Prior Art

The cameras designed for general use by people these days have almost every necessary function thereof automated, including such devices as an automatic focusing device, an automatic film winding and rewinding device, an automatic exposure device, an automatic light adjustment device, etc. These automatic devices aim at improving the quality of pictures. Despite these devices, however, a blurred picture would result if the photographer moves or the camera moves due to the operation of an internal device such as a return mirror, a shutter drive mechanism or the like. The conventional still picture cameras have been provided with some device that displays a warning against camera shake in the event of photographing at a shutter speed lower than a certain given speed. However, this is nothing more than a mere mechanical warning and does not permit confirmation of an actual camera shake. Furthermore, this conventional camera shake warning device has been incapable of giving any warning in the event of actual camera shake occurring in photographing at a relatively high shutter speed.

Figures 1A, 1B:
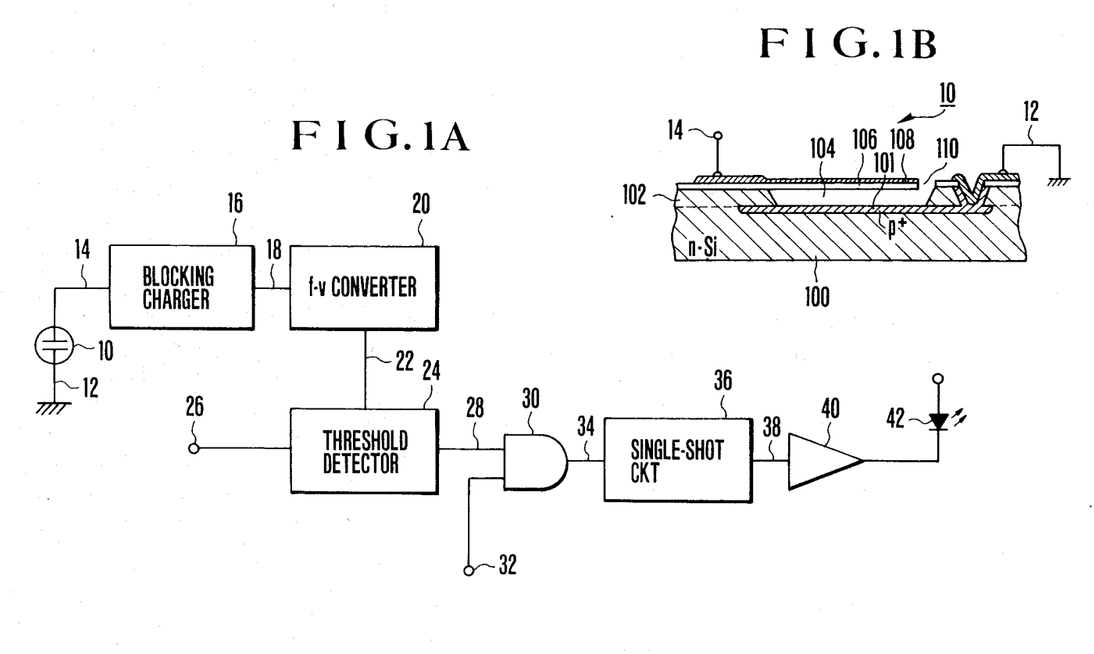
FIGS. 1A and 1B are illustrations showing the prior art arrangement.
Figure 2:
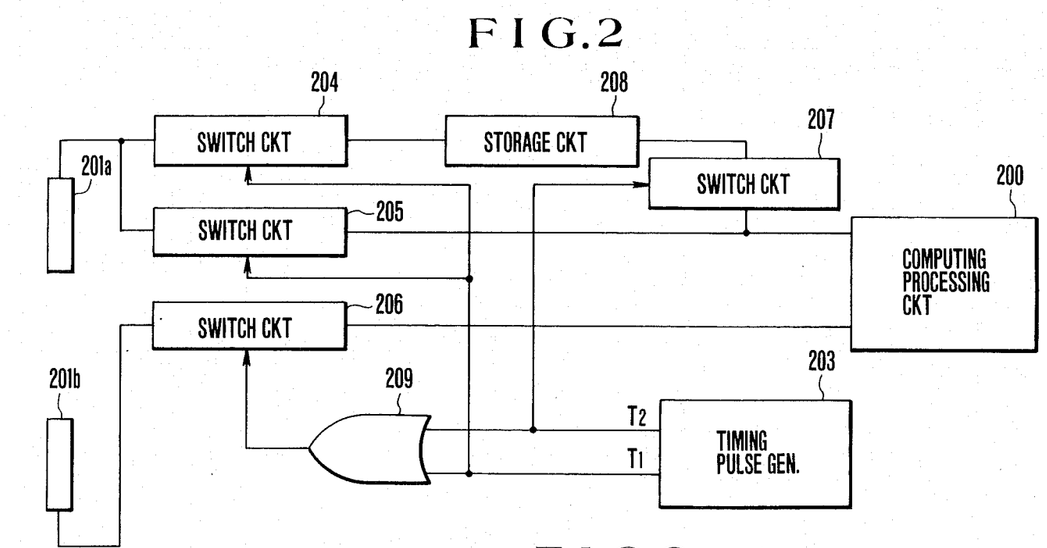
FIG. 2 is a circuit diagram showing the circuit arrangement of the embodiment.

A camera shake detecting device has been known from the disclosure made in Japanese Laid-Open Patent Application No. SHO 58-70217. This prior art device is arranged as shown in FIGS. 1A and 1B of the accompanying drawings. The device comprises acceleration detecting means which is arranged to detect acceleration and to generate an electrical signal representing the degree of the acceleration; warning display means for displaying a warning; a warning circuit which is responsive to the opening and closing operation of a shutter of the camera and is arranged to energize the warning display means when the above-stated electrical signal exceeds a threshold value, so that a warning can be displayed indicating that a photography image has blurred. This device necessitates use of an acceleration detector 10. The detector 10 is preferably a micromechanical acceleration detector which is formed in one unified body with an integrated circuit of a metal-oxide semiconductor (MOS) as shown in FIG. 1B. The micro-mechanical acceleration detector is prepared in the following manner: An n-type silicon (n-Si) substrate 100 has a P+ area 101 formed by partly doping it with boron (B). Over this n-Si substrate is formed an epitaxial layer 102. The epitaxial layer 102 is provided with a shallow gate shaped etched void space 104. A cantilever 110, which consists of a silicon dioxide ($SiO_2$) layer 106 and a Cr-Au layer 108, extends over the void space 104. When the whole detector 10 vibrates, a distance between the cantilever 110 and the P+ layer 101 varies. This variation is taken out from electrodes 12 and 14 as a change in electrostatic capacity.

The cameras of today, as mentioned above, have versatile functions, which are sequentially controlled by a microcomputer consisting of integrated circuits. Accordingly, a camera shake detecting device must be compatible with these circuits. Otherwise, circuit arrangement becomes difficult. For example, if a camera is provided with such a blur detecting element and a blur control circuit that are incompatible with the conventional circuits, the camera must have a complex arrangement of electrical circuits and components.

It is a first object of this invention to provide a blur detecting device which is compatible with circuits conventionally arranged for a camera.

It is a second object of this invention to provide a blur detecting device including a sensor and an optical system which are usable also as a sensor and an optical system for an automatic focusing (AF) device.

A blur detecting device according to this invention is arranged to use a charge coupled device (CCD) which has been developed by the prior art for automatic focusing and to produce a blur detection signal on the basis of an image signal obtained from the CCD.

The term "camera shake", as used herein for the purpose of this invention, means shaking or vibration of the camera resulting in a blur of the image of an object to be photographed due to movement of the camera caused, for example, by the vibration of a hand holding the camera and also by the vibration of the internal mechanism of the camera.

It is a third object of this invention to provide a blur detecting device wherein an image signal of a CCD which is obtained by converting an image of the object to be photographed into an electrical signal is processed under a control performed based on photographing conditions, such as film sensitivity information (ISO) and set shutter speed information (TV) or set aperture value information (AV); and the device gives a blur detection signal which is adjusted to these photographing conditions.

These and further objects and features of the invention will become apparent from the following detailed description of preferred embodiments thereof taken in conjunction with the accompanying drawings.

SUMMARY OF THE INVENTION

A blur detecting device including a photo-electric conversion element arranged to receive an image of an object to be photographed and to convert the image into an electrical signal, which corresponds to the intensity distribution of the image received; timing control means for controlling the timing at which the output of the photo-electric conversion element is produced, the means being arranged to control the output of the photo-electric conversion element to be produced at a first point of time, and to control the output of the photo-electric conversion element to be produced at a second point of time; storing means for storing an in-focus state on the basis of the signal of the photo-electric conversion element produced at the first point of time; detecting means for detecting a focused state on the basis of the signal of the photo-electric conversion element produced at the second point of time; and means for detecting a blur of the image by comparing the output signal of the focused state detecting means with the stored signal of the in-focus state storing means.

BRIEF DESCRIPTION OF THE DRAWINGS

FIGS. 2 through 7 show a first embodiment of this invention. Of these drawings.

FIGS. 8 through 12 show a second embodiment of this invention. Of these drawings.

DETAILED DESCRIPTION OF THE PREFERRED EMBODIMENTS

Figure 3:
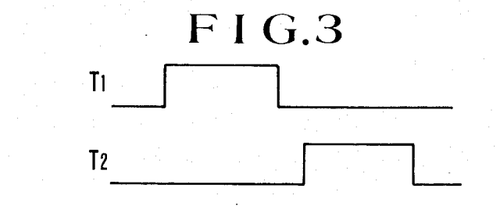
FIG. 3 is a wave form chart showing the output wave form of a timing pulse generator 203.
Figure 4:
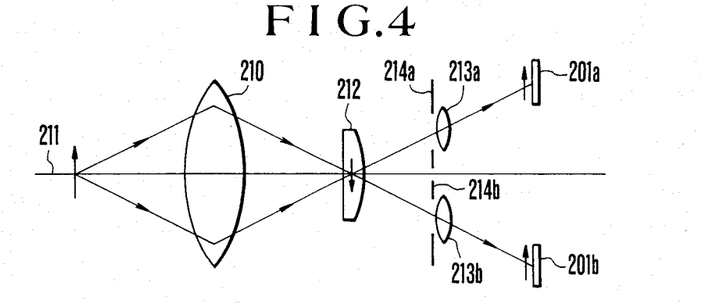
FIGS. 4, 5A, 5B and 5C show the optical arrangement of the embodiment.

A first embodiment of this invention is arranged as shown in FIGS. 2 through 7. This embodiment comprises storage means for storing an image signal obtained from photo-electric conversion means under an in-focus condition; and detecting means for detecting a relative change between the image signal stored by the storage means and another image signal obtained from the photo-electric conversion means after the first image signal has been stored. It is a feature of this embodiment that the photo-electric conversion means is arranged to be used both for blur detection and for focus detecton. Details are as follows:

In these drawings FIG. 2–FIG. 7, the illustrations include photo-electric conversion element arrays 201a and 201b; a computing processing circuit 200 which is arranged to compute signals obtained through photo-electric conversion performed by the photo-electric conversion element arrays 201a and 201b; a timing pulse generator 203 which is arranged to generate timing pulses T1 and T2 as shown in FIG. 3; switch circuits 204–207 which are arranged to be turned on and off by the timing-pulses T1 and T2; a storage circuit 208 which is arranged to store, for once, the signal which is photo-electric converted by the element array 201a and is supplied to the storage circuit via the switch circuit 204; an OR gate 209; a photo taking lens 210; an optical axis 211; a field lens 212; secondary image forming lenses 213a and 213b which are symmetrically arranged across the optical axis 211 behind the field lens 212; and stops 214a and 214b which are arranged close to the secondary image forming lenses 213a and 213b respectively.

Figure 5A:
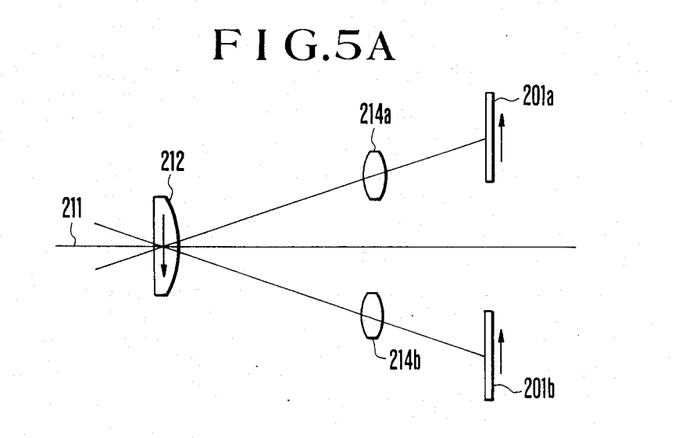
Figure 5B:
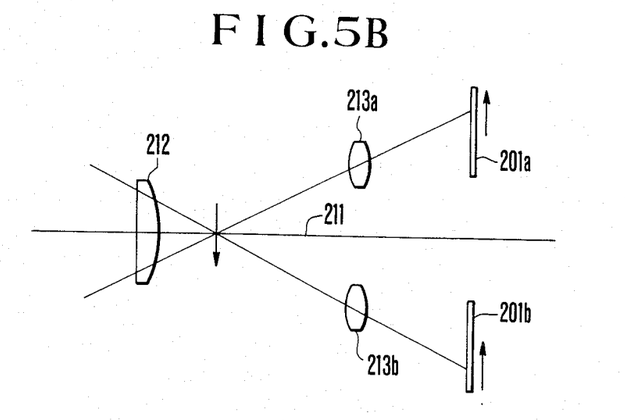
Figure 5C:
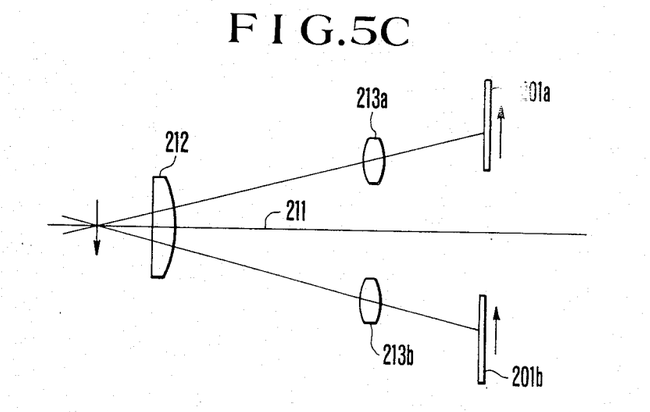

The embodiment performs a focus detecting operation in the following manner: The field lens 212 serves to approximately form the image of the exit pupil of the photo taking lens on the pupil surfaces of the secondary image forming lenses 213a and 213b. As a result, the light beams incident on the secondary image forming lenses 213a and 213b are emitted from non-overlapping equal areas which correspond to the secondary image forming lenses 213a and 213b on the exit pupil surface of the photo taking lens 210. When spatial images formed in the neighborhood of the field lens 212 are re-imaged on the photo-electric conversion element arrays 213a and 213b by the secondary image forming lenses 213a and 213b, the positions of the two images formed on the photo-electric conversion element arrays 201a and 201b vary as the spatial images change their positions in the direction of the optical axis. FIGS. 5A, 5B and 5C show this. In an in-focus condition as shown in FIG. 5A, the two images are located in the middle of the photo-electric conversion element arrays 201a and 201b. In a far-focus condition, the two images move farther away from the optical axis as shown in FIG. 5B. In the case of a near-focus condition, the two images move closer to the optical axis 211, as shown in FIG. 5C. The intensity distribution of these images is photo-electric converted and the electrical signals thus obtained are processed to detect discrepancy or deviation of the relative positions of the two images. By this, a focusing state can be determined. The deviating degree of the two images from each other is proportional to the degree of focusing error. Utilizing this fact, the shifting extent of the photo taking lens 210 is computed by shifting one of the two images relative to the other. More specifically, the deviating degree of the two images is computed from the photo-electric conversion signals representing the two images by the computing processing circuit 202 shown in FIG. 2. In other words, the signals obtained by photo-electric conversion are converted by an A/D converter into digital data consisting of a plurality of bits and the focusing error is obtained by computing the deviating degree of the two images by a microcomputer. For example, in the process of the circuit, one of the images which is expressed as b(i) is moved relative to the other image expressed as a(i) and an extent to which the image is moved before the two images coincide with each other is considered to be the deviating degree. For that purpose, the following computing formula is used:

$$Vm = \Sigma |a(i) - b(i+1+m)| - \Sigma |a(i+1) - b(i+m)|$$

Figure 6:
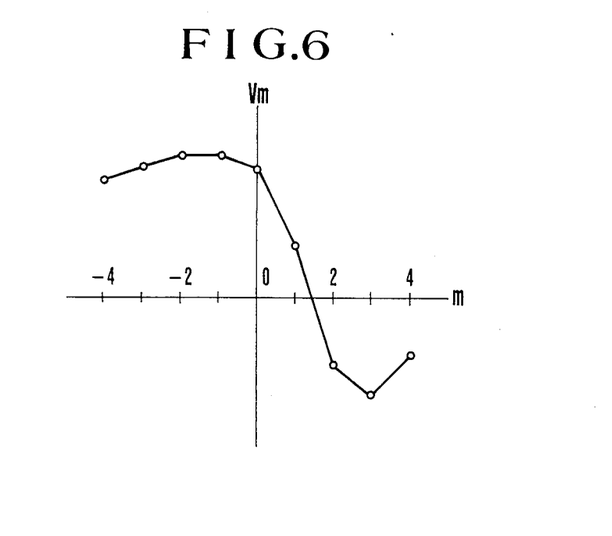
FIG. 6 is a graph showing results of computation carried out based on a computation formula.
Figure 7:
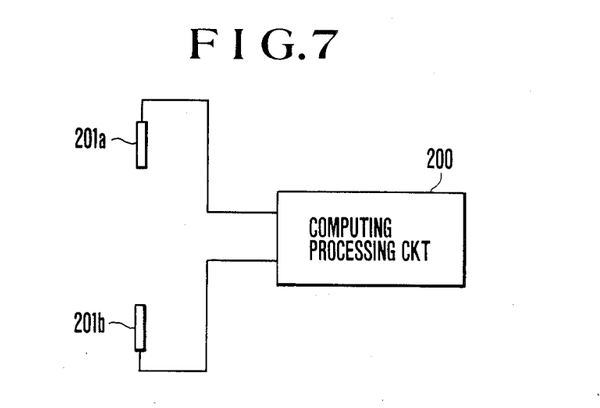
FIG. 7 is a block diagram showing the electrical connection made at the time of focus detection.

This formula is repeatedly computed with a relative displacement value m applied to each integer within a set range to obtain thereby the relative displacement value m which is obtained when a correlation value Vm becomes zero. Assuming that the correlation value Vm becomes as shown in FIG. 6 when the relative displacement degree m is changed within a range of $-4 \leq m \leq +4$, there is obtained an image deviating degree corresponding to 1.5 pitches, because the correlation value Vm should be zero when the two images coincide with each other. In that instance, the switches 206 and 207 are kept on by a circuit which is not shown. The circuit arrangement is as shown in FIG. 7. Furthermore, the focus detecting method described above is well known.

Next, the blur detecting operation of the embodiment is as follows: As mentioned in the foregoing, the photo-electric converted signals produced from the photo-electric conversion element arrays 201a and 201b are subjected to the computing process at the computing processing circuit 202. The photo taking lens 210 is set in an in-focus state as shown in FIG. 5A by means of a focus control circuit which is not shown (correlation value Vm=0). Then, output signals of the conversion element arrays 201a and 201b coincide with each other. Under this condition, when the timing pulse T1 (see FIG. 3) is generated by the timing pulse generator 203, the switch circuits 204 and 205 turn on and the OR gate 209 opens to also turn on the switch circuit 206. The photo-electric converted signals produced from the element arrays 201a and 201b are thus supplied to the computing processing circuit 202 via the switch circuits 205 and 206. Meanwhile, since the switch circuit 204 is also on, the signal which is photo-electric converted by the photo-electric conversion element array 201a is supplied via the switch circuit 204 to the storage circuit 208 and is stored there.

Following that, when the timing pulse T2 is generated by the timing pulse generator 203, the switch circuit 207 turns on and the OR gate 209 opens to also turn on the switch circuit 206. Thus, at the time of the timing pulse T2, the signal photo-electrically converted by the photo-electric conversion element array 201b and the signal which has been stored at the storage circuit 208 are supplied to the computing processing circuit 202 and the deviation or discrepancy between the two images represented by these signals is obtained. The blur is detected from the discrepancy between the two images in the following manner:

No discrepancy or little discrepancy between the two images is considered to indicate no blur.

Discrepancy between the two images is considered to indicate a blur.

Furthermore, in correlation value Vm=0, the value of m corresponds to the degree of blur.

In this embodiment, the signals obtained from the photo-electric conversion element arrays 201a and 201b are taken out in a time serial manner. The signal first taken out is stored. Then, the stored signal and the signal next taken out are concurrently applied to the circuit 202 for the computing process. This arrangement permits the secondary image forming lenses 213a and 213b and the computing processing circuit 202 to perform combined functions of blur detection and focus detection. The embodiment is thus capable of performing blur detection while satisfying the requirement for reduction in size and cost of the camera.

Furthermore, it is readily conceivable to arrange some warning means such as a display device within the camera for giving a warning or some means for preventing shutter release in the event of detection of a blur exceeding a given allowable degree. Such an arrangement effectively saves the film from being wasted.

In this embodiment, the photo-electric conversion element arrays 201a and 201b correspond to the photo-electric conversion means of the invention; the storage circuit 208 corresponds to memory or storage means; and the computing processing circuit 202 corresponds to computing processing means and detecting means.

The embodiment is arranged to time serially take out the output signals of the photo-electric conversion element arrays 201a and 201b at the points of time defined by the timing pulses T1 and T2. However, this arrangement may be changed to have the signal, which is taken out at the time of the timing pulse T1, replaced with an output signal of the photo-electric conversion element array 201a or 201b which is obtained at the time of completion of a focus detecting operation. Furthermore, the embodiment is arranged to perform blur detection by using the signals obtained at the time of in-focus from the two photo-electric conversion element arrays 201a and 201b. However, it goes without saying that the same purpose is also attainable by using time serial image signals produced from one and the same photo-electric conversion element array 201a or 201b. Furthermore, the computing processing circuit 202 is arranged to be used for the combined purposes of focus detection and blur detection. However, the computing processing circuit 202 may be arranged to be used solely for focus detection. In that event, some detecting means may be separately arranged to detect a relative change in the time serial image signals for blur detection.

The arrangement of this embodiment is applicable not only to focus detecting devices of the secondary image forming type but also to devices of the dimming type and the base-line range-finder type using the discrepancy between two images.

Figure 8:
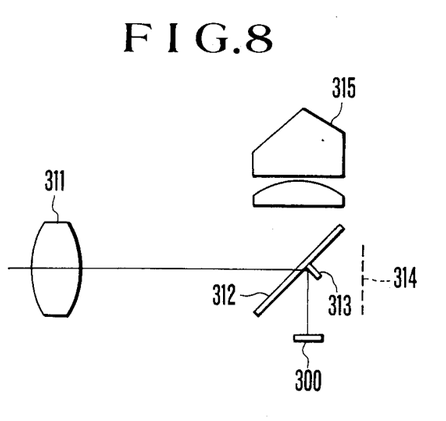
FIG. 8 shows the optical arrangement of the embodiment.

A second embodiment of this invention is arranged as shown in FIGS. 8 through 12. In this case, blur detection is carried out using a distance measuring sensor 300 of an object-distance detecting device or an automatic focusing device, such as a CCD sensor. FIG. 8 shows the optical system of the second embodiment. The illustration includes the above-stated distance measuring sensor 300; an image forming optical system 311; a half-mirror 312; an auxiliary mirror which is arranged to lead the light of an object to be photographed to the sensor 300; an image forming plane 314 such as a film surface; and a view finder optical system 315.

Figure 9:
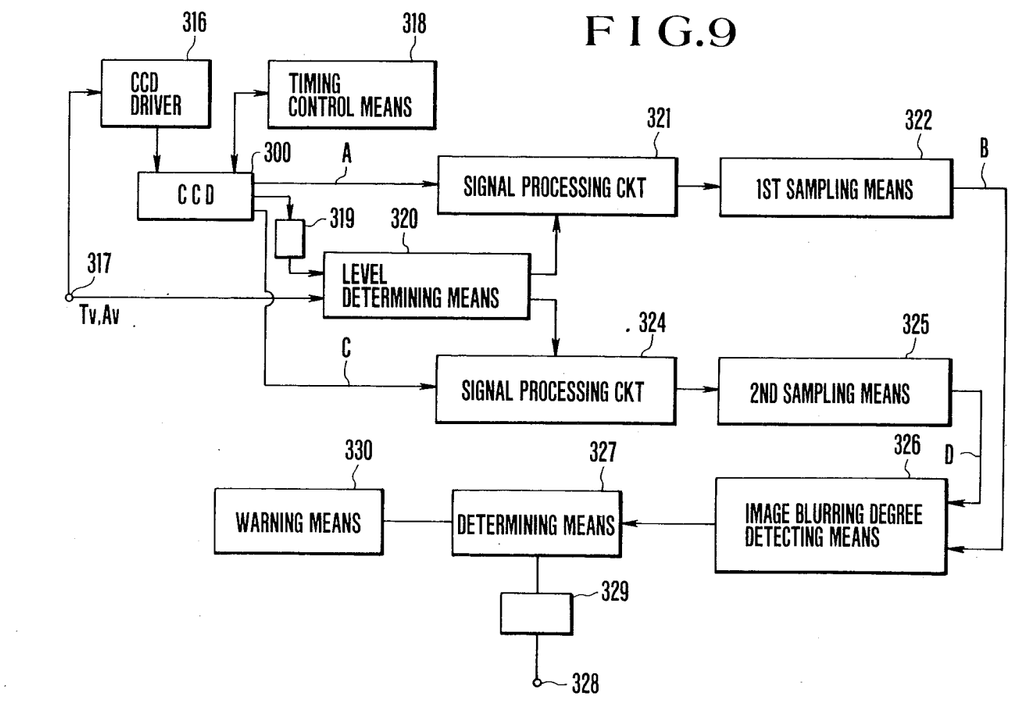
FIG. 9 shows the circuit arrangement of the embodiment.

FIG. 9 shows the circuit arrangement of the second embodiment. The circuit arrangement includes an accumulation time control circuit 316 which is used when a CCD 300 is employed as the above-stated sensor. The control circuit 316 is arranged to determine the accumulating time of the CCD 300 according to a signal from an exposure information setting input terminal 317 representing a setting value of, for example, shutter time or an aperture. Timing control means 318 is arranged to control the output timing of the CCD 300 to have the outputs thereof produced at an arbitrarily set first point of time and a second point of time after the camera is operated or, for example, a shutter release button is depressed. Level detecting means 319 is arranged to detect the maximum and minimum levels of the signals produced from the CCD 300 at the above-stated first and second points of time. Level determining means 320 is arranged to receive the signal from the above-stated exposure information setting input terminal 317 and a signal produced from the level detecting means 319 and to determine the sampling level of the outputs of the CCD 300. First and second signal processing circuits 321 and 324 are arranged to receive respectively the output signals of the CCD 300 which are produced at the first and second points of time and have wave forms shown in FIGS. 10A and 10C. The signal processing circuits 321 and 324 process these signals according to the level value determined by the level determining circuit 320. First and second sampling means are arranged to sample and hold the outputs of the first and second signal processing circuits 321 and 324.

Image blurring degree detecting means 326 is arranged to detect the blurred degree of an image from signals produced by the first and second sampling and holding means. Determining means 327 is arranged to determine whether the output of the image blurring degree detecting means 326 is above or below a set reference value of blur. Set blur degree input means 329 is arranged to supply the set reference value of blur to the determining means 327.

A set blur value E corresponds to a blurred degree allowable on the film surface. This allowable blur degree varies with enlargement magnification to be set in printing a picture from a negative film. For example, assuming that the allowable blurred degree on the negative film for a service size print is 75 μm, the allowable blurred degree for a cabinet size print which is about twice as large as the service size print is 37 μm. Therefore, the set blur degree E is determined prior to photographing by supplying information on the magnification of printing enlargement to be made to the set blur degree input means 329 and the determining means 327 is provided with this information beforehand. Furthermore, this enlargement magnification information is obtained, for example, with a switch (not shown), connected to the terminal 328, which is provided on the outside of the camera operated by the photographer.

Warning means 330 is arranged to give a warning with an audible or visible signal when the image blur E exceeds the preset degree of blur.

The operating principle of this embodiment is as follows: In photographing an object, when the shutter button of the camera is depressed, the first and second points of time are set by the timing control means 318. At the first point of time, information on the shutter speed and the aperture value set at that point of time is supplied to the driving circuit 316 (or the CCD driver 316) from the terminal 317. Then, the optimum accumulation time of the CCD line sensor 300 is determined in the manner mentioned in the foregoing. The CCD line sensor 300 is driven by the driving circuit 316 to produce an image signal which is obtained at the first point of time as represented by a signal A shown in FIG. 10A. This image signal is supplied to the first signal processing circuit 321 and the level determining means 320. At the level determining means 320, the information on the shutter speed and the aperture value is received via the terminal 317. Furthermore, the level determining means obtains a difference between the highest and lowest levels from the signal produced from the CCD line sensor 300 and determines a level value L. If the accumulation time of the CCD line sensor 300 is long, the output of the CCD line sensor becomes a blurred image signal. Furthermore, if the difference between the highest and lowest levels of the output signal of the CCD line sensor 300 is small, it indicates that the luminance of the object to be photographed varies little. In that instance, the level value L must be a large value. The level value L is thus determined on the basis of the information of the shutter speed and the aperture value and the difference value between the highest and lowest levels of the output signal of the CCD line sensor 300. The difference between the highest and lowest levels is determined to be a value between 40 and 100%.

Figure 10A:
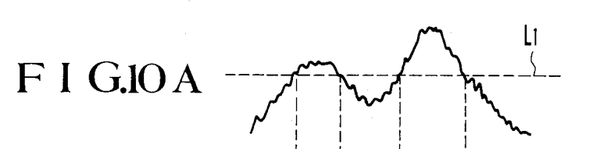
FIGS. 10A–10D are wave form charts showing the wave forms of the outputs of various parts of FIG. 9 and those of sampling signals.
Figure 10B:
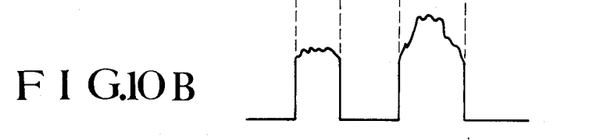

A value which is obtained by subtracting this level L from the highest level of the signal A is supplied as a first threshold value L1 to the first signal processing circuit 321. At the first sampling means 322, a portion of the signal A higher than the first threshold value L1 is sampled to obtain a sampling signal B, as shown in FIG. 10B. This signal B is held at the first means 322.

Figure 10C:
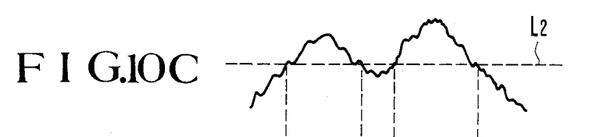
Figure 10D:
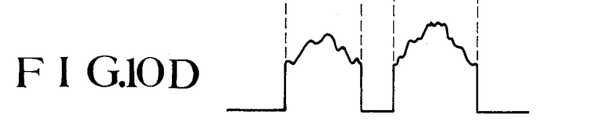

With the second point of time set to be after the first point of time, the degree of image blur which takes place between the first and second points of time can be measured. The signal obtained at the second point of time is read out in the same manner as in the case of the first point of time. An image signal C, which is produced from the CCD line sensor 300 at the second point of time as shown in FIG. 10C, is transmitted to the second signal processing circuit 324. Then, the second sampling means 325 samples the signal C on the basis of a second threshold value L2 which is obtained by the level determining means 320 in the same manner as in the case of the first threshold value L1. By this, a sampling signal D is obtained as shown in FIG. 10D. The sampling signal D is held at the second sampling means 325.

With the sampling signals B and D obtained in this manner, a correlation degree (or value) is obtained by the detecting means 326 using the correlation function shown in the following formula. Assuming that the correlation degree is S(x), the number of a picture element of the CCD line sensor 300 is k; the values of the output of a picture element number k in the sampling signals B and D are B(k) and D(k); and a shifting degree is x, the correlation degree S(x) can be expressed as shown below:

$$S(x) = \sum_k B(k) \cdot D(k, x)$$

wherein: $x = 0, \pm 1, \pm 2, -$

In this formula, D(k, 0) is equal to D(k) while D(k, 1) represents a signal obtained by shifting the whole Dk) an extent corresponding to one picture element. Furthermore, in the above formula, the symbol x represents either of the opposite directions of plus and minus.

The shifting degree x of the signal D, which is obtained when the correlation degree S(x) becomes a maximum degree, corresponds to a blurred degree, of the image. The image blurring degree thus computed by the image blur degree detecting means 326 is compared with the preset blur value E by the determining means 327. A warning is given to the photographer with a light emitting diode or the like lit by the warning means 330 when the image blur degree exceeds the preset blur value E.

Figure 11:
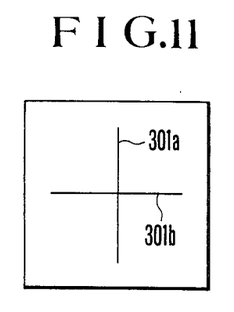
FIGS. 11 and 12 show the arrangement of the CCD's when a plurality of CCD's are employed.
Figure 12:
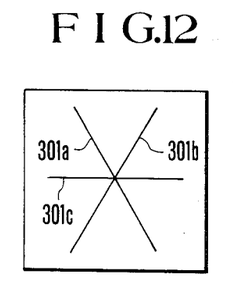

The blurred degree to be detected by the image blur degree detecting means 326 is obtained, for example, for each of the directions of the CCD line sensors 301a and 301b of FIG. 11. Where there is only one CCD line sensor 300 and the blurring degree of the image is known beforehand to be great particularly in the shutter button pushing direction of the camera, the CCD line sensor 300 may be arranged solely in that direction. Furthermore, where three CCD line sensors 300 are used as shown in FIG. 12, the blurred degree of image can be measured by dividing it into components of three directions.

In the embodiment described, the signal obtained from the CCD line sensor 300 is arranged to be sampled because of the time required for computing and processing. However, where the correlation degree is obtainable at a high speed, the signal does not have to be sampled. Furthermore, in the case of this embodiment, the degree of an image blur occurred between the first and second points of time is measured. However, it is possible to read out image signals from the line sensor 300 at third and fourth points of time in addition to the second point of time and to compute also the degree of the image blur which occurred between the first and third points of time and between the first and fourth points of time respectively. Such an arrangement enables measurement of the image blurring degree in the form of the function of time. Furthermore, the embodiment is arranged to determine the preset blur degree E on the basis of the increased magnification for printing. However, the preset blur degree E may be set at a constant value solely for the ordinary service size print.

The location of the CCD line sensor 300 is not limited to the position shown in FIG. 8 but can be arranged to have the image formed via a lens in any other position as long as the position of the CCD line sensor 300 is at the same optical distance from the film surface. It is also possible to arrange the CCD line sensor 300 in combination with some external lens without recourse to the photo taking lens 311. In this specific embodiment, a light emitting diode is employed as the camera shake warning display means. However, the warning arrangement may be replaced with some other arrangement using, for example, a sound, a letter or the like.

The camera shake or image blur detecting device according to this invention, as described in the foregoing, is arranged to detect the camera shake by suitably processing the output signal of the CCD line sensor 300 and to give a warning to the photographer accordingly. This enables the photographer to make up for a failure due to the camera shake by immediately taking another picture. It is another advantage of the invention that, with the direction and the components of the camera shake stored at a memory storage as a data, the stored data can be advantageously used for preventing any blur that might occur in ensuing photographing operations.

What is claimed is:

1. A blur detecting device for a camera, comprising:
a sensor having a function of photo-electric conversion upon receiving light from an object;
timing means for controlling output timing of said sensor at a first point of time and a second point of time in a photographing operation of the camera;
means for sampling an output signal of said sensor by a first threshold level at said first point of time and for sampling the output signal of said sensor by a second threshold level at said second point of time;
means for determining said first and second threshold levels of said sampling means based on information on a preset or computed shutter speed and/or a preset or computed aperture value; and
means for detecting an amount of blur in an image by outputs of said sampling means at said first point of time and said second point of time.

2. A blur detecting device for a camera, comprising:
a charge coupled device for producing an image signal respectively at a first point of time and at a second point of time in a photographing action of the camera;
means for detecting the maximum level signal and the minimum level signal of said charge coupled device at said first point of time and at said second point of time;
means for introducing preset or computed exposure information;
level determining means for introducing a signal of each one of said level detecting means and said exposure information input means for determining a sampling level of said charge coupled device;
means for sample-and-holding an image signal at each one of said first point of time and said second point of time depending on the sampling level of said level determining means; and
means for detecting an amount of blur of an image between each one of said points of time by a sample signal at each one of said points of time and said sample-and-hold means.

3. A blur detecting device for a camera, comprising:
a line sensor having a photo-electric conversion function upon receiving light reflected from an object;
timing control means for controlling output generating timings of said line sensor at a first point of time and at a second point of time in a photographing action of the camera;
drive means for controlling a storing of said line sensor depending on preset or computed exposure information;
a signal processing circuit for processing output signals from said line sensor at said first point of time and at said second point of time;
level detecting means for detecting the maximum level signal and the minimum level signal in output signals at each one of said points of time from said line sensor and determining a threshold level of said signal processing circuit;
means for sampling an output of said signal processing circuit depending on the threshold level of said level detecting means;
means for detecting an amount of blur of an image by introducing an output signal of said sampling means;
means for comparing a signal from said blur amount detecting means with a reference value and judging an amount of a blur of an image; and
means for producing a warning depending on a judging result of said judging means.

4. A blur detecting device for a camera, comprising:
a sensor for producing an image signal at each one of a first point of time and a second point of time in a photographing operation of the camera;
a signal processing circuit for introducing preset or computed exposure information and processing output signals of said sensors at least depending on said exposure information;
means for sampling a signal from said signal processing circuit at said first point of time and at said second point of time;
means for introducing a signal from said sampling means and detecting an amount of blur of an image between each one of said points of time;
means for setting a value relating to a desired magnification of an enlargement of a negative film produced from a sensitive film in said camera;
means for introducing an output signal of said setting means and an output signal of said blur amount detecting means and judging a blurring of an image; and
means for generating a warning based on a result of judgment of said judging means.

* * * * *